United States Patent Office 3,214,456
Patented Oct. 26, 1965

3,214,456
PHOSPHONIC ACID ESTERS AND METHODS FOR THEIR PRODUCTION
Günter Oertel, Cologne-Flittard, Hans Holtschmidt, Cologne-Stammheim, and Peter Fischer, Cologne-Flittard, Germany, assignors to Farbenfabriken Bayer Aktiengesellschaft, Leverkusen, Germany, a German corporation
No Drawing. Filed Oct. 19, 1962, Ser. No. 231,850
Claims priority, application Germany, Jan. 5, 1961, F 32,903
5 Claims. (Cl. 260—461)

This application is a continuation-in-part of application Serial No. 162,563, filed December 27, 1961, now abandoned.

The invention relates to new phosphonic acid esters and a method for their production. The new phosphonic acid esters are defined by the generic structural formula

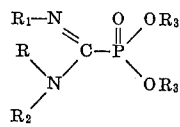

in which R is a member of the group consisting of phenyl, an alkyl up to 6 carbon atoms, and alkyl-phenyl, a chlorophenyl, a phenyl-isocyanate, $R_3$ stands for a member of the group consisting of a lower alkyl radical up to 4 carbon atoms and a lower chloro-alkyl radical, $R_2$ stands for a member selected from the group consisting of cyano, nitroso, carbon oxychloride, mono-chloro-carbon sulfide, tri-chloro-carbon sulfide, a phosphonic acid ester group and carboxy alkyl, carboxy aryl, carboxy alkenyl, a carboxylic acid ester group and a radical represented by the formula

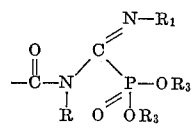

and $R_1$ is a member selected from the group consisting of phenyl, an alkyl up to 6 carbon atoms, and alkyl-phenyl, a chloro-phenyl, a phenyl-isocyanate, and a radical represented by the formula

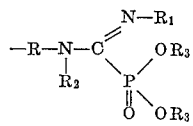

The novel phosphonic acid esters of the present invention are prepared by reacting N,N,N'-trisubstituted haloformamidines of the general formula

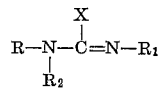

with trialkyl phosphites. The production of N,N,N'-trisubstituted haloformamidines of the aforesaid general formula is known and can be carried out, inter alia, by the addition of acid halides to carbodiimides. See German Patent 1,131,661 and French Patent 1,307,151.

As starting materials, N,N,N'-tribustituted haloformamidines of the following formulae are suitable, for example:

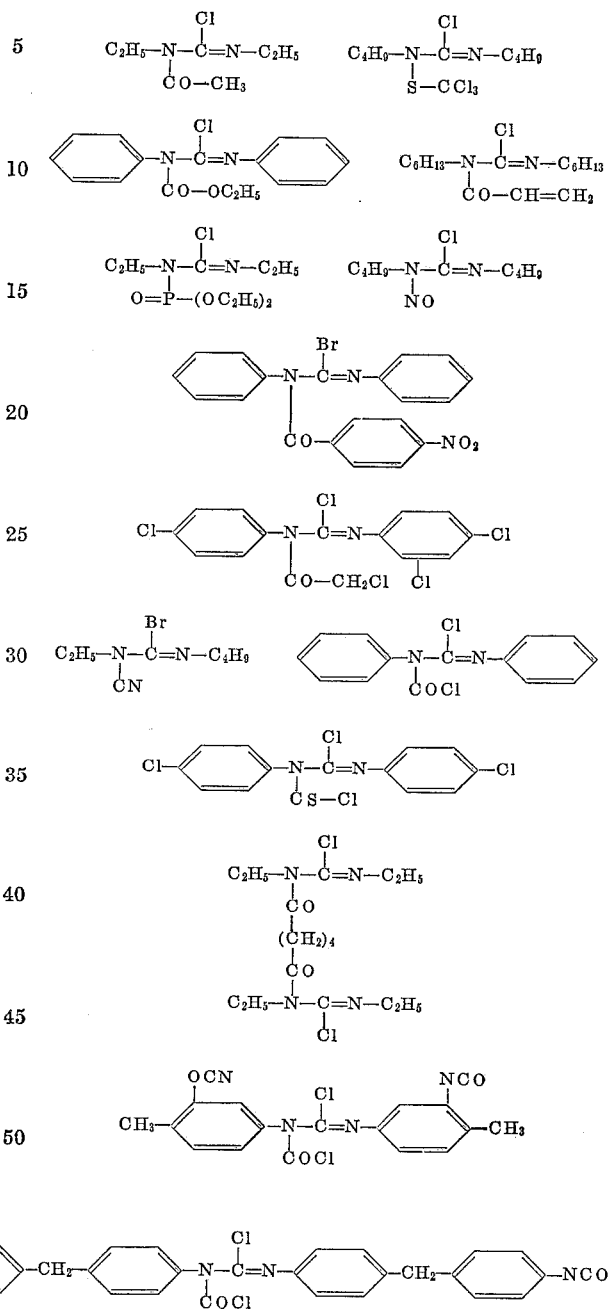

Furthermore, those compounds are also suitable starting substances for the process according to the invention which contain N,N,N'-trisubstituted haloformamidine grouping several times; e.g. the compound of the formula

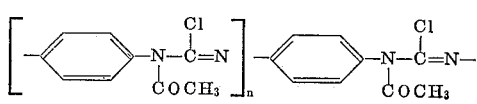

For the reaction with N,N,N'-trisubstituted haloformamidines, trialkyl phosphites are preferably used within the scope of the process according to the invention, e.g. the compounds P(—OCH₃)₃; P(—OC₂H₅)₃; P(—OCH₂—CH₂—Cl)₃; P(—OC₄H₉)₃;

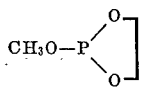 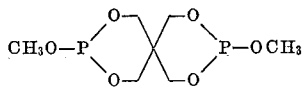

Moreover, other esters of the trivalent phosphorus which contain at least one alkoxy group directly linked to phosphorus and are therefore capable of rearrangement according to Arbusow, are, of course, also suitable for the reaction.

The reaction conditions under which the new phosphonic acid esters can be produced may vary within certain limits and depend chiefly on the type of the N,N,N'-trisubstituted haloformamidine with which the trialkyl phosphite is to be reacted. In general, the reactions are carried out by simply mixing stoichiometric quantities of the reaction components at temperatures between 20 and 150° C. Additions of solvents or diluents may, in general, be dispensed with. The chemically highly reactive halogen atom in a N,N,N'-trisubstituted haloformamidine reacts under these conditions with the trialkyl phosphite in the manner of an Arbusow reaction according to the following formulae:

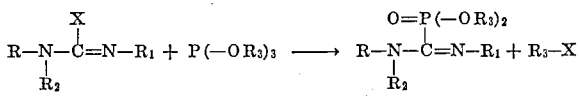

If the N,N,N'-trisubstituted haloformamidine used according to the invention is a compound which contains in the N-acyl radical another easily labile halogen atom suitable for the Arbusow reaction, the quantity of trialkyl phosphite to be reacted is chosen so that both halogen atoms can react with the phosphite. The other reaction conditions for this case are the same. For example, N,N'-diphenyl-N-chloroformyl-chloroformamidine reacts with trimethyl phosphite in the molar ratio of 1:2 according to the following equation:

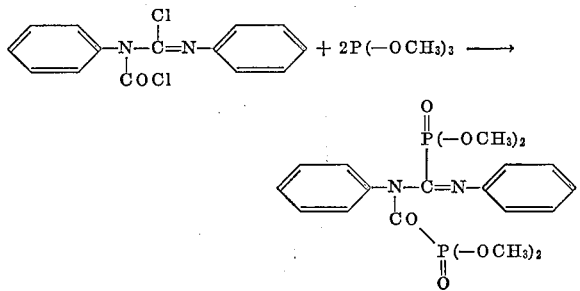

Since it is known that N,N,N'-trisubstituted haloformamidines easily react at an elevated temperature to form carbodiimides and acyl halides according to the following equation:

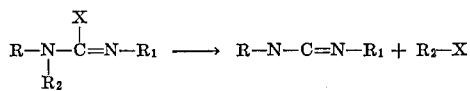

and, on the other hand, acyl halides extremely easily react according to Arbusow with trialkyl phosphites according to the equation:

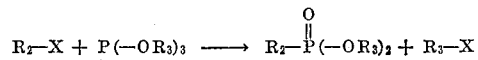

a smooth course of the reaction under the aforesaid conditions was not to be expected. However, the process according to the invention, surprisingly, yields the desired phosphonic esters in almost theoretical yields.

Some of the new phosphonic acid esters of the present invention are oils, some crystalline products. They are colorless or have a yellow to red-brown coloration, they are stable even on prolonged storage at room temperature.

These compounds may be employed as biologically-active materials in various formulations such as liquid and solid. The compositions may include carriers, diluents, extenders, fillers, conditioners, wetting, emulsifying and dispersing agents. The compounds may be used in combination with other known biologically-active ingredients such as fungicides and insecticides.

The new compounds of the invention kill a variety of insects, mites, for example, flies and spider mites. They are active at relatively low concentrations. The following specific examples show in a representative operation the use of the compounds as an insecticide.

EXAMPLE A

Flies (*Drosophila melanogaster*) are contacted with a test formulation consisting of an aqueous dilution of the compound

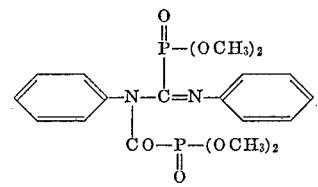

The aqueous dilution has been prepared by admixing them with the same amount of dimethyl formamide as an auxiliary solvent adding thereto 20 percent by weight referred to active ingredient of a commercial emulsifier consisting of benzyl hydroxy polyglycol ether containing about 10 to 15 glycol residues, and diluting at last this premixture with water to a concentration of 0.1 percent by weight of the active ingredient. The present compound in this concentration shows a 100 percent killing effect.

EXAMPLE B

Spider mites (species *Tetranychus telarius*) are contacted with a test formulation consisting of an aqueous dilution of the compound

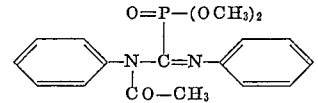

The aqueous dilution has been prepared as indicated in Example 1. The application of the present compound in the concentration of 0.1 percent of weight resulted in the kill of 100 percent of spider mites.

The following examples may describe some of the specific features of the invention, but they are given primarily for the purpose of illustrating the present invention:

*Example 1*

Production of

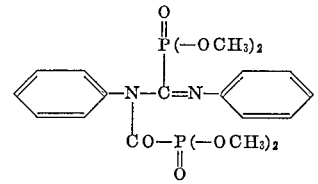

74.4 grams of trimethyl phosphite are added dropwise to 88 parts by weight of N,N'-diphenyl-N-chloroformyl-chloroformamidine at 30–40° C. while cooling. When the initially very vigorous dissociation of methyl chloride has subsided, the reaction mixture is heated to 100° C. for 30 minutes. Subsequently the easily volatile portions are removed at the same temperature under vacuum. 129 parts by weight (98.5% of the theoretical) of reaction product are obtained in the form of a yellow oil having the following analytical composition:

Calculated: C, 49.1; H, 5.0; N, 6.4; P, 14.1. Found: C, 49.6; H, 5.23; N, 6.3; P, 14.0.

Example 2

Production of

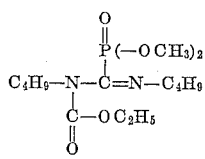

13.7 parts by weight of trimethyl phosphite are added dropwise to 29 parts by weight of N,N'-dibutyl-N-carbethoxy-chloroformamidine. The reaction mixture is boiled under reflux, until the whole trimethyl phosphite has reacted, i.e. for 1–2 hours. Volatile reaction products are distilled off under vacuum at 100° C. 40 parts by weight of the phosphonic ester of the constitution given above remain as residue in the form of yellow oil.

Example 3

Production of

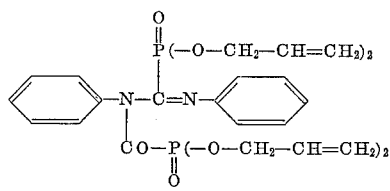

40 parts by weight of N,N'-diphenyl-N-chloroformyl-chloroformamidine are mixed with 55 parts by weight of triallyl phosphite at 20–30° C. while cooling. This mixture is heated to 90–100° C. for 1 hour. Subsequently the allyl chloride formed is distilled off at 100° C. under vacuum. In the residue remain 75 parts by weight (100% of the theoretical) of a pale brown oil.

*Analysis.*—Calculated: C, 57.4; H, 5.5; N, 5.1; P, 11.4. Found: C, 56.9; H, 5.6; N, 4.8; P, 11.0.

Example 4

Production of

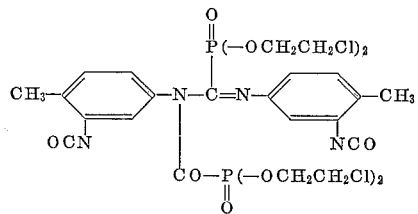

40.4 parts by weight of N,N'-di-(-3-isocyanate-4-methyl-phenyl)-N-chloroformyl-chloroformamidine are mixed with 54 parts by weight of tris(-β-chloroethyl)-phosphite at 20–30° C. The mixture is heated to 80–100° C. within 30 minutes, the ethylene chloride formed thus being distilled off. The reaction is completed by heating to 100° C. for 2 hours under vacuum. The residue consists of 73 parts by weight of a yellow-brown oil having a NCO-content of 11%.

We claim:
1. A compound of the formula

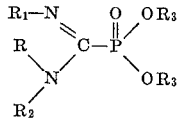

in which R is a member selected from the group consisting of phenyl, alkyl having up to 6 carbon atoms, cyclohexyl, lower alkyl substituted phenyl, chlorophenyl, isocyanato substituted diphenyl methane, lower alkyl substituted phenylisocyanate and phenyl isocyanate; $R_3$ stands for a member selected from the group consisting of lower alkyl having up to 4 carbon atoms, lower alkenyl and lower chloroalkyl; $R_2$ stands for a member selected from the group consisting of —CN, —NO, —COCl, —S—CH$_2$Cl, —S—CCl$_3$,

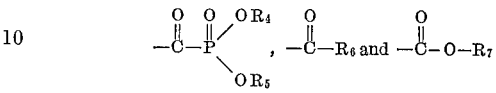

wherein $R_4$ and $R_5$ are each a member selected from the group consisting of lower alkyl, lower alkenyl, and lower chloroalkyl, $R_6$ is a member selected from the group consisting of lower alkyl, lower chloroalkyl phenyl, nitrophenyl and lower alkenyl, and $R_7$ stands for lower alkyl; and $R_1$ is a member selected from the group consisting of phenyl, alkyl having up to 6 carbon atoms, cyclohexyl, lower alkyl substituted phenyl, chlorophenyl, isocyanato substituted diphenyl methane, lower alkyl substituted phenyl isocyanate and phenyl isocyanate.

2. A compound of the formula

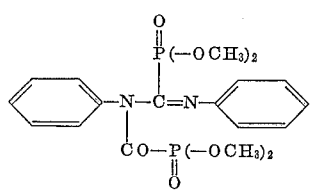

3. A compound of the formula

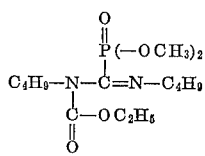

4. A compound of the formula

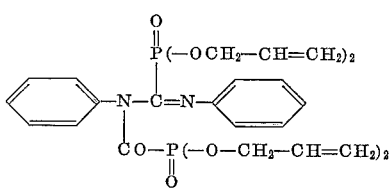

5. A compound of the formula

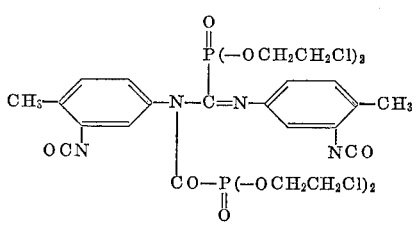

References Cited by the Examiner
UNITED STATES PATENTS 3,053,876   9/62   Malz et al. _____ 260—461

CHARLES B. PARKER, *Primary Examiner.*

IRVING MARCUS, *Examiner.*